2,969,116
Patented Jan. 24, 1961

2,969,116

METHOD OF CONTROLLING AND EXTINGUISHING FIRES IN PYROPHORIC FLUIDS

Arthur B. Guise, Marinette, Wis., assignor to Ansul Chemical Corporation, Marinette, Wis., a corporation of Wisconsin No Drawing. Filed Mar. 19, 1959, Ser. No. 800,388

5 Claims. (Cl. 169—1)

This invention relates to a method of controlling and extinguishing fires in pyrophoric fluids such as metal alkyls and in particular aluminum and boron triethyl and trimethyl.

The metal alkyls are assuming increased importance when used by themselves or in admixture with hydrocarbon fuels for use as fuels in rockets, ram-jet and the conventional type air and space craft power plants. Their great reactivity makes them valuable as chemical intermediates and they are used as catalysts in certain polymerization reactions.

In general, the metal alkyls have extremely low auto-ignition temperatures and tend to ignite spontaneously upon exposure to the air. Temperature and humidity are both factors in the ease of ignition. Aluminum triethyl, for example, will not always ignite when in a container exposed to the air but will invariably ignite when poured from a container or when escaping from a leak. The aluminum alkyls react violently when in contact with water and should be kept from all contact with moisture. The boron alkyls, such as boron triethyl, do not react with water to a point preventing the use of water spray or fire extinguishing foam as extinguishing agents. Certain types of boron compounds, however, cannot be extinguished by the use of water alone.

When a metal alkyl fire takes place, a two-fold problem is presented. First, the flame must be extinguished to protect surrounding equipment and prevent the fire or leak from becoming worse, and second, the unburned fuel must be removed from the area to prevent the danger from its becoming reignited. Thus, the vaporizing type extinguishing agents, such as chlorobromomethane and carbon dioxide, may extinguish the fire but as soon as the extinguishing vapors are dissipated, and this may occur quite rapidly in the presence of a wind, the remaining fuel very likely will reignite. Another procedure which has been employed is the addition of a high boiling oil, such as lubricating oil, to the burning metal alkyl to so dilute the metal alkyl that it will no longer ignite spontaneously. This method, however, has the very great disadvantage that unless expertly done a second fire more serious than the first may result.

It is an object of this invention, therefore, to provide a method for the extinguishment of metal alkyl fires. It is a further object of this invention to provide for the safe disposal of the metal alkyl remaining unburned after the fire has been extinguished.

The objects of this invention are attained by contacting the burning metal alkyl with a quantity of material capable of adsorbing relatively large quantities of the metal alkyl. By adsorbing the metal alkyl the adsorbent material removes most of it from contact with the air and that which remains on the exterior of the adsorbent particle burns to form a noncombustible metallic oxide coating which inhibits further burning. I prefer to apply the adsorbing material in finely divided form from a pressurized fire extinguisher but this type of agent is also effective when employed in rather large grains and applied to the burning metal alkyl by pail, scoop or shovel. For discharge from a pressurized extinguisher, I prefer to use an adsorbent all of which will pass through a 20-mesh sieve and which will not pass through a 200-mesh sieve. Difficulties in discharge are encountered with a coarser material and finer material is too easily dispersed by wind or the draft created by the fire.

Examples of adsorbent materials which are suitable for this use are activated alumina, attapulgus clay, silica-alumina cracking catalyst in various proportions, such as 75% silica and 25% alumina, bentonite, fuller's earth halloysite, and silica gel. These materials must be applied in activated form and their surfaces must be free from moisture. Activation and moisture removal can be accomplished by heating to a temperature of 300° C. (about 550° F.) for a period of 4 hours or so.

These absorptive type materials may also be used to advantage with standard sodium bicarbonate type dry chemical fire-extinguishing agents. Standard dry chemical fire-extinguishing powder consists essentially of powdered sodium bicarbonate and additives to maintain the powder in dry free-flowing condition as disclosed in U.S. Patents 1,793,420 and 2,631,977. The standard type of dry chemical alone will extinguish the flame of a burning metal alkyl but a reflash of the remaining fuel constitutes a danger.

By addition of adsorbing agent to an alkali metal bicarbonate type extinguishing agent, a composition is provided which can both extinguish the flame and adsorb the unburned fuel.

The effectiveness of my method will be illustrated by the following examples.

*Example 1*

Six pounds 8 ounces of aluminum triethyl were placed in a 2¼ square foot pan. Spontaneous ignition did not occur but heavy, dark gray fumes were given off. After ignition with a torch, the aluminum triethyl was allowed to burn for one minute when it was extinguished with a four-second application of bicarbonate type dry chemical. After 25 seconds the aluminum triethyl reflashed and was allowed to burn for about 1½ min. when the flame was again extinguished with a short application of dry chemical. Thirty seconds later another reflash occured. This extinguishment-reflash sequence occurred until the fuel was consumed, demonstrating that no permanent control of the fire was obtained with ordinary sodium bicarbonate type dry chemical.

*Example 2*

Five pounds of aluminum triethyl were placed in a 2¼ square foot pan. Ignition was spontaneous and the fire burned quietly. Twenty-eight pounds of dry sand were applied with very little effect. One minute later the fire was extinguished by a short burst of dry chemical applied from the extinguisher (2½ pounds were applied in 1.9 seconds). The extinguishment-reflash sequence experienced in Example 1 was repeated with the final reflash taking place 12 min. 45 sec. after the test began, although the fire appeared to burn with less intensity and the final reflashes could be temporarily extinguished with applications of sand.

*Example 3*

Five pounds of a mixture comprising 80% aluminum triethyl and 20% aluminum trimethyl were placed in a 2¼ square foot pan. Ignition was spontaneous and the fire appeared to burn more intensely than when only aluminum triethyl was used. Twelve and one-half pounds of activated alumina were applied to the fire but extinguishment was not effected. One minute later the fire was extinguished with application of bicarbonate type dry chemical but immediately reflashed. However, after extinguishment 25 sec. later with another application of dry chemical, there was no reflash but dark gray fumes continued to be given off for an additional 3 minutes. There was a slight reflash when the adsorbed material was disturbed but this was immediately re-extinguished.

*Example 4*

A composite type dry chemical was prepared comprising 50% of the sodium bicarbonate type extinguishing agent similar to that disclosed in U.S. Patent 1,793,420, and 50% of a high surface area silica-alumina catalyst containing 25% alumina and 75% silica and having an average particle size of about 200 mesh. Five pounds of aluminum triethyl were placed in a 2¼ square foot pan and ignited. Seventeen pounds of this dry chemical were applied to the fire and completely extinguished it, although heavy gray fumes were given off for about 5 minutes. Ninety-seven percent of the extinguishing agent was discharged from the extinguisher.

The dry activated adsorbent materials previously mentioned may be mixed with the dry chemical fire-extinguishing composition, such as disclosed in U.S. Patent 1,793,420, in varying proportions. I have found it advantageous to use about 50% by weight of a suitable adsorbent when the composite dry chemical composition is used for extinguishing fires in pyrophoric fluids. The particle size of the adsorbent is not critical as long as it is of a size that will not obstruct the discharge orifice or otherwise interfere with the discharge from a pressurized fire extinguisher. Particle sizes of an adsorbent which will pass through a 20-mesh sieve and which will not pass through a 200-mesh sieve are satisfactory for use in available pressurized fire extinguisher equipment. As illustrated in the foregoing examples, I may apply the adsorbent material and the dry chemical separately from suitable pressurizer fire extinguishers or the mixture of both, in suitable proportions, may be applied to extinguish metal alkyl fires or other pyrophoric organometallic fluids.

It will thus be seen that the application to a burning metal alkyl of an adsorbing agent enables the fire to be readily controlled and extinguished and permits safe disposal of the unburned fuel.

I claim:

1. The method of controlling and extinguishing fires in pyrophoric fluids which comprises contacting the pyrophoric fluids with an adsorbent activated agent free of adsorbed liquid and then extinguishing the flames with a dry chemical type fire-extinguishing agent.

2. The method according to claim 1, in which the adsorbing agent is activated alumina.

3. The method according to claim 1, in which the adsorbing agent is silica-alumina.

4. The method of controlling and extinguishing fires in pyrophoric fluids which comprises projecting from a pressurized fire extinguisher into the area of the burning said pyrophoric fluids a finely divided solid adsorbent activated agent free of adsorbed liquid and then extinguishing the flames by projecting into said flames a dry chemical type fire-extinguishing agent.

5. The method of controlling and extinguishing fires in pyrophoric fluids which comprises simultaneously projecting from a pressurized fire extinguisher into the area of the burning said pyrophoric fluids a finely divided adsorbent activated agent free of adsorbed liquid and a fire-extinguishing agent comprising finely divided sodium bicarbonate.

References Cited in the file of this patent

UNITED STATES PATENTS

| | | |
|---|---|---|
| 1,229,064 | Gillette | June 5, 1917 |
| 1,793,420 | Block | Feb. 17, 1931 |
| 2,212,735 | Guthrie | Aug. 27, 1940 |
| 2,368,209 | Fahey et al. | Jan. 30, 1945 |

FOREIGN PATENTS

| | | |
|---|---|---|
| 3,892 | Great Britain | June 5, 1913 |